Aug. 11, 1936.  C. E. FREDERICKSON  2,050,304
DIFFERENTIAL MECHANISM
Original Filed Feb. 21, 1935  4 Sheets-Sheet 1

Inventor
Clayton E. Frederickson
By Albert E. Dieterich
Attorney

Aug. 11, 1936.   C. E. FREDERICKSON   2,050,304
DIFFERENTIAL MECHANISM
Original Filed Feb. 21, 1935   4 Sheets-Sheet 2
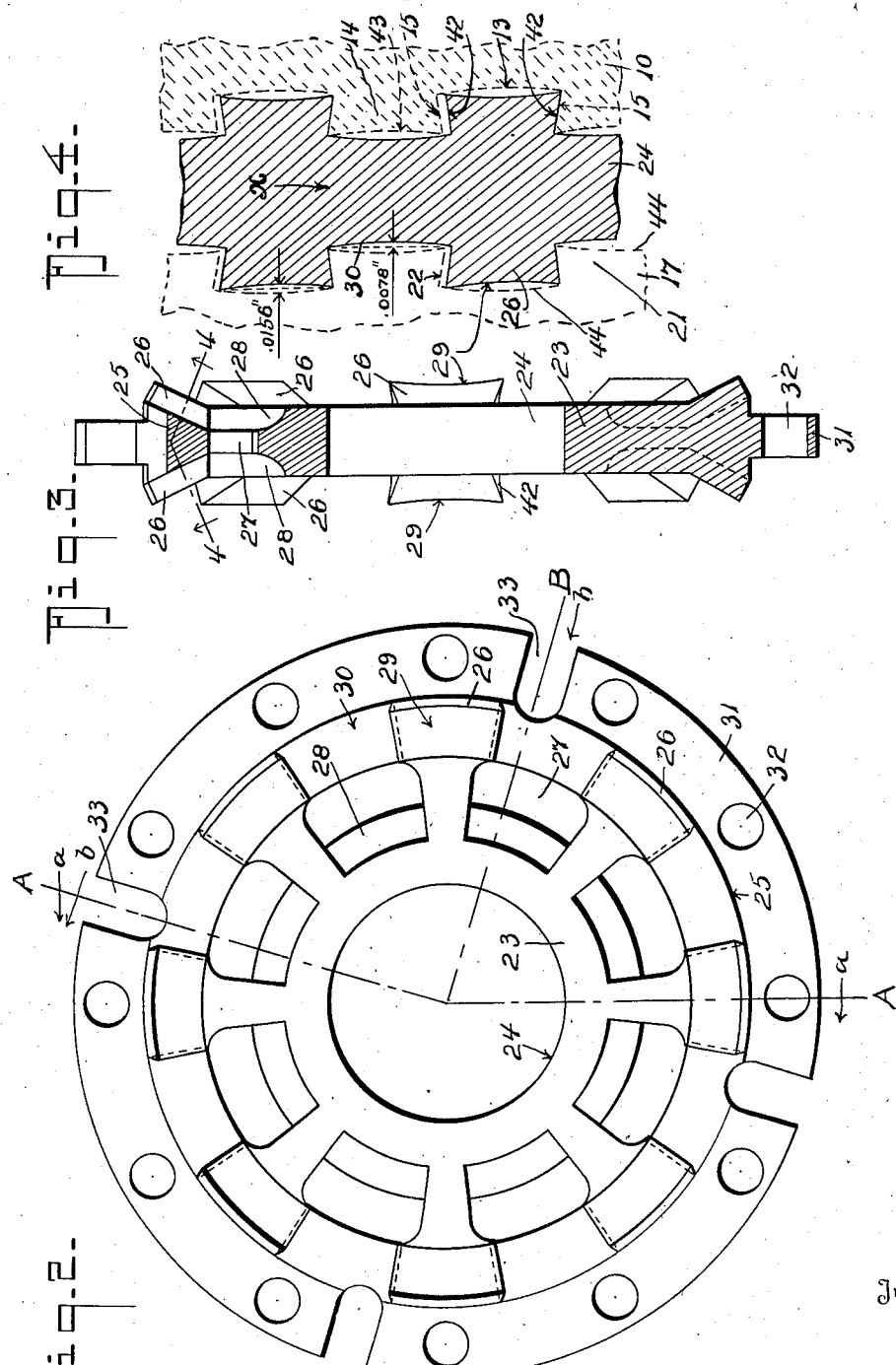
Inventor
Clayton E. Frederickson
By Albert E. Dieterich
Attorney

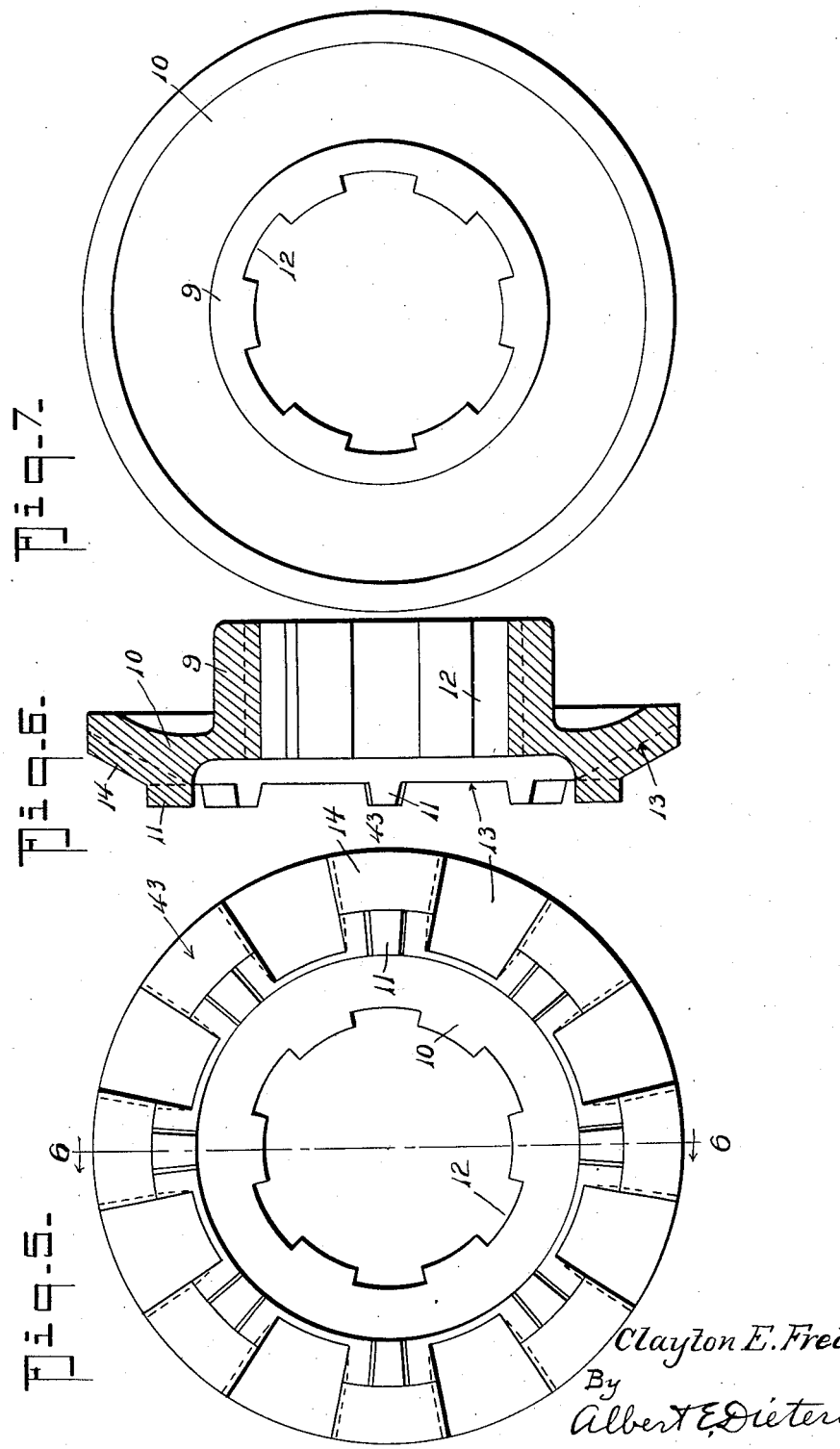

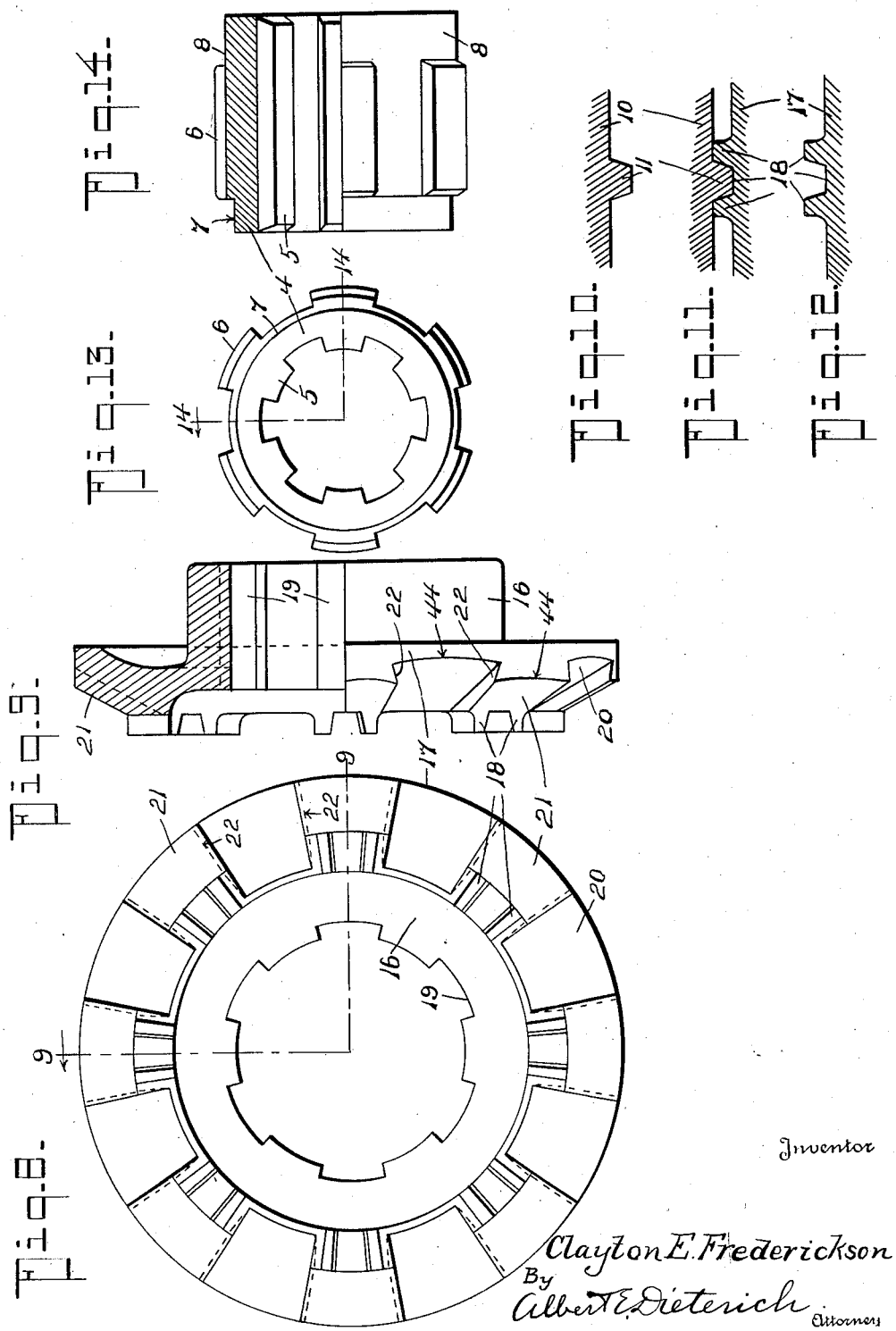

Patented Aug. 11, 1936

2,050,304

UNITED STATES PATENT OFFICE 2,050,304

DIFFERENTIAL MECHANISM

Clayton E. Frederickson, Chicago, Ill.

Application February 21, 1935, Serial No. 7,609
Renewed November 21, 1935

12 Claims. (Cl. 74—389.5)

My invention relates to the art of wheeled motor vehicles and particularly to that part of the vehicle known as the "differential". Differentials may generally be classed in two types: the geared and the gearless. The present invention relates to the gearless type, and it particularly has for its object to provide such a differential of as few parts as possible and one possessing a minimum amount of lost motion.

Further, the invention has for an object to provide a gearless differential which may be used on all types of cars and in other places where differentials are employed.

Other objects will in part be obvious and in part be pointed out hereinafter.

To the attainment of the aforesaid objects and ends the invention still further resides in the novel details of construction, combination and arrangement of parts, all of which will be first fully described in the following detailed description, then be particularly pointed out in the appended claims, reference being had to the accompanying drawings, in which:—

Figure 2 is a side elevation of the driving clutch member showing the formation and arrangement of the clutch teeth thereon.

Figure 3 is a vertical cross section on the line A—A of Figure 2, looking in the direction of the arrows a.

Figure 4 is an enlarged detail section on the line 4—4 of Figure 3 and indicates how the teeth of the driving clutch member mesh with those of a driven clutch member.

Figure 5 is an elevation of the tothed face of the male driven clutch plate.

Figure 6 is a vertical cross section on the line 6—6 of Figure 5.

Figure 7 is an elevation of the male driven clutch plate, looking at the back thereof.

Figure 8 is an elevation of the toothed face of the female driven clutch plate.

Figure 9 is a vertical cross section on the line 9—9 of Figure 8.

Figure 10 is a detail diagrammatic view of one cam tooth of the male clutch plate.

Figure 11 is a detail diagrammatic view of one cam tooth each of the male and female clutch plates meshed together.

Figure 12 is a detail diagrammatic view of one of the female clutch plate's cam teeth.

Figure 13 is an end elevation of one of the shaft sleeves on which the plates shown in Figures 5 and 8 are mounted.

Figure 14 is a part vertical section and part elevation taken on the line 14—14 of Figure 13.

Figure 1:
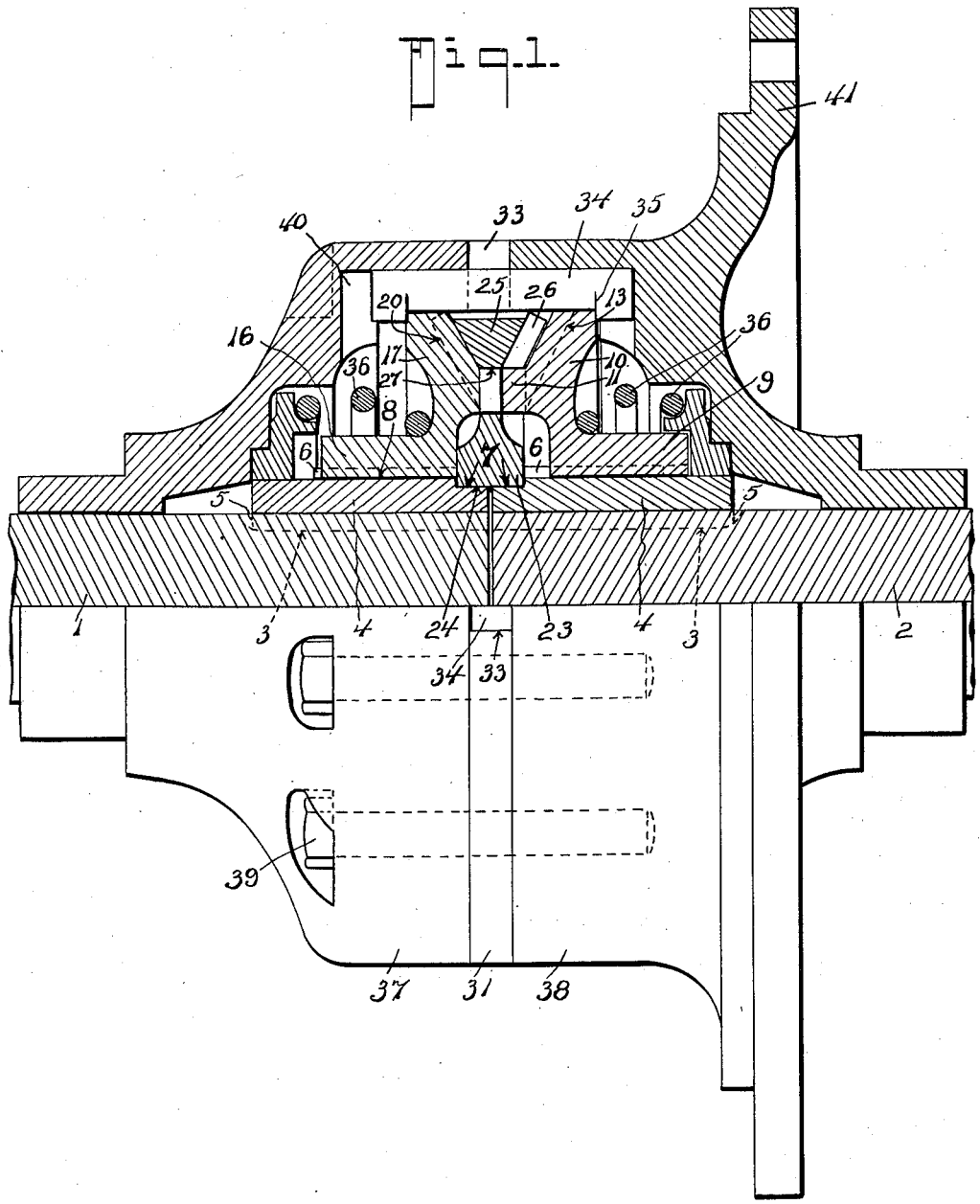
Figure 1 is a part vertical section and part elevation of a differential embodying my invention (the section being taken on the line A—B of Figure 2, looking in the direction of the arrows b).

In the drawings in which like numerals and letters of reference indicate like parts in all the figures, 1 and 2 represent the respective shafts or axles of an automobile rear assembly. These shafts are located in alignment and their adjacent ends are provided with suitable spline grooves 3.

A spline collar 4 having internal splines 5 is fitted on each shaft. These collars have a tight fit on the shafts, although the shafts may be pulled out of the collars when it is desired to remove and replace the shafts. The collars 4 are also provided with external splines 6 which engage with the spline grooves 12 and 19 respectively, hereinafter again referred to. The collars 4 have external bearing surfaces 7 on which the driving clutch member 23 is mounted, and each collar has a bearing surface 8 for the hubs 9 and 16 of the male and female driven clutch plates or members 10 and 17 respectively.

The male driven clutch member is illustrated in detail in Figures 5, 6 and 7, to which reference is made. This driven clutch member is provided with cam teeth 11 and has its hub 9 provided with spline grooves 12. The clutch face 13 of the male driven clutch member is inclined to the vertical as best shown in Figure 6. (In the preferred embodiment this inclination is at an angle of twenty-five degrees.) On this clutch face are provided the clutch teeth 14, the driving edges of which are undercut as at 15 (see Figures 4 and 5), the purpose of which will later appear. The faces of the teeth 14 and the faces of the spaces between the teeth are preferably slightly concaved as at 43 in Figure 4, the purpose of which will later appear.

By reference to Figures 8 and 9 it will be seen that the construction of the female driven clutch member 17 is, except as to the cam teeth, precisely the same as that of the male driven clutch member 10. The female driven clutch member includes the hub 16 having spline grooves 19 to fit on the collar 4, and it has an inclined clutch face 20 which is provided with clutch teeth 21 having undercut portions 22 (see Figure 9) similar to the corresponding parts of the male driven clutch member. The faces of the teeth 21 and the spaces between the teeth are concaved as at 44 (see Figures 4 and 9) similarly to the concurvatures 43 of the male driven clutch members.

The driving clutch member 23 is illustrated in detail in Figures 2 and 3, by reference to which it will be observed that the driving clutch member 23 has a bearing surface 24 to ride on the surfaces 7 of the collars 4. It also has inclined toothed portions 25 which are provided with clutch teeth 26 similar in form and size to those of the male and female driven clutch plates and designed to cooperate with the same. The teeth 26 are provided with undercut portions 42, best shown in Figures 3 and 4.

The driving clutch member is also provided with a set of elongated openings 27 and recesses 28, the recesses being provided for the reception of the toothed portions of the male and female driven clutch members and the openings being provided for the reception of the male and female cam teeth of those members (see Figure 1). The teeth 26 have their faces concaved, as at 29, and the spaces between those teeth are correspondingly slightly concaved as at 30 similar to the teeth and spaces of the driven clutch members.

The driving clutch member also has a peripheral flange 31 that is provided with bolt holes 32 to cooperate with the bolt holes of the casing 37—38 which encloses the hereinbefore described structure. The flange 31 is also provided with a set of slots 33 into which are inserted the cross connecting keys 34 whose shoulders 35 engage the outer faces of the male and female members 10 and 17 respectively and limit the distance these members may be spread apart.

The male and female driven clutch members are constantly urged toward the driving clutch member by means of clutch springs 36, it being understood that the male and female clutch members while turning with the shafts 2 and 1 respectively may slide separately along the axes of the shaft the distance limited by the space between the shoulders 35 of the keys 34.

The differential casing is made in two parts 37 and 38, and these parts are secured together rigidly to the flange 31 by means of suitable cap screws 39, it being understood that the casing 37—38 is provided with suitable recesses 40 for the reception of the cross connecting keys 34. The shanks of the keys 34 are made with the face which rests on the members 10 and 17 curved to the peripheral curvature of those members so that the keys will not turn on their own axes once the assembly of parts has been completed. One casing section (say 38) is formed with a flange 41 to which the usual ring gear (not shown) may be secured in any of the usual ways.

*Operation*

Assuming the vehicle to be running forward or backward in a straight line, the parts will be in the position indicated in Figure 4 with both clutch members 10 and 17 in full mesh with the clutch member 23. In this position assume the member 23 to be moving in the direction of the arrow $x$ in Figure 4. The undercut portions 42 on the advance edges of the teeth 26 will engage the undercut portions 15 and 22 on the trailing edges of the teeth 14 and 21 and interlock therewith, as it were; the inclinations of the contacting parts serve to tend to draw together the three clutch members 23, 10 and 17.

When the vehicle turns, the outside wheel will be moving faster than the inside wheel and consequently the cam teeth 11 and 18 will enmesh, thereby forcing the cam plate of the outside wheel out of mesh with the driving plate 23, at which time the parts will be positioned as shown in Figure 1. When the machine again straightens out, the parts will mesh once more and driving power will be applied to both shaft sections 1 and 2.

The only lost motion encountered is that due to the depths of the undercut portions of the teeth 21, 26 and 14 (see Figure 4) which is approximately equal to the pitch of cam teeth 11—18.

Concaving the opposing faces of the teeth 26 and the spaces between them, and concaving the teeth 14 and 21 and the spaces between them, allows for lubricant to act as a cushion and to prevent wear of the faces while the members are de-clutched.

From the foregoing it will be seen that my improved differential compensates for curves automatically. In the straightaway it transmits power equally and positively to both driving wheels of the vehicle and turns them at exactly equal speeds regardless of their traction. It is impossible, when this differential is used, for one driving wheel to stand still while the other spins through lack of traction. If both wheels lose their grip on the road it is only necessary to provide traction for one wheel to be on one's way.

The invention has other advantages over the gear type of differentials, which advantages will be clear to those skilled in the art.

While I have illustrated a preferred embodiment of the invention it is to be understood that changes in the construction and arrangement of parts may be made within the scope of the appended claims without departing from the spirit of the invention.

What I claim is:

1. A differential comprising a driving clutch member, aligned shaft sections, means to mount said clutch member on the adjacent ends of said shaft sections, said driving clutch member having on both sides similar annular series of spaced generally radially disposed clutch teeth and having a corresponding set of transverse apertures, two independently driven clutch members located at opposite sides of said driving clutch member, one mounted on each shaft section to turn therewith and be slidable along the same, said two clutch members each having clutch teeth to cooperate with those of said driving clutch member, one of said driven clutch members having male cam teeth and the other having female cam teeth designed to mesh with each other within said transverse apertures, expansion springs independently to hold said driven clutch members in normal engagement with said driving clutch members, said cam teeth being adapted to unmesh and permit one driven clutch member to unmesh from said driving clutch member when unequal torque resistance is encountered by the shaft sections.

2. A differential comprising a driving clutch member, aligned shaft sections, means to mount said clutch member on the adjacent ends of said shaft sections, said driving clutch member having on both sides similar annular series of spaced generally radially disposed clutch teeth and having a corresponding set of transverse apertures, two independently driven clutch members located at opposite sides of said driving clutch member, one mounted on each shaft section to turn therewith and be slidable along the same, said two clutch members each having clutch teeth to cooperate with those of said driving clutch member, one of driven clutch members having male cam teeth and the other having female cam teeth designed to mesh with each other within said transverse apertures, expansion springs independently to hold said driven clutch members in normal engagement with said driving clutch members, said cam teeth being adapted to unmesh and permit one driven clutch member to unmesh from said driving clutch member when unequal torque resistance is encountered by the shaft sections, said clutch teeth having their contacting edges undercut.

3. A differential comprising a driving clutch member, aligned shaft sections, means to mount said clutch member on the adjacent ends of said shaft sections, said driving clutch member having on both sides similar annular series of spaced generally radially disposed clutch teeth and having a corresponding set of transverse apertures, two independently driven clutch members located at opposite sides of said driving clutch member, one mounted on each shaft section to turn therewith and be slidable along the same, said two clutch members each having clutch teeth to cooperate with those of said driving clutch member, one of said driven clutch members having male cam teeth and the other having female cam teeth designed to mesh with each other within said transverse apertures, expansion springs independently to hold said driven clutch members in normal engagement with said driving clutch members, said cam teeth being adapted to unmesh and permit one driven clutch member to unmesh from said driving clutch member when unequal torque resistance is encountered by the shaft sections, and having their clutch teeth inclined to the vertical.

4. A differential comprising a driving clutch member, aligned shaft sections, means to mount said clutch member on the adjacent ends of said shaft sections, said driving clutch member having on both sides similar annular series of spaced generally radially disposed clutch teeth and having a corresponding set of transverse apertures, two independently driven clutch members located at opposite sides of said driving clutch member, one mounted on each shaft section to turn therewith and be slidable along the same, said two clutch members each having clutch teeth to cooperate with those of said driving clutch member, one of said driven clutch members having male cam teeth and the other having female cam teeth designed to mesh with each other within said transverse apertures, expansion springs independently to hold said driven clutch members in normal engagement with said driving clutch members, said cam teeth being adapted to unmesh and permit one driven clutch member to unmesh from said driving clutch member when unequal torque resistance is encountered by the shaft sections, said clutch teeth having their contacting edges undercut, and having their clutch teeth inclined to the vertical.

5. A differential comprising a driving clutch member, aligned shaft sections, means to mount said clutch member on the adjacent ends of said shaft sections, said driving clutch member having on both sides similar annular series of spaced generally radially disposed clutch teeth and having a corresponding set of transverse apertures, two independently driven clutch members located at opposite sides of said driving clutch member, one mounted on each shaft section to turn therewith and be slidable along the same, said two clutch members each having clutch teeth to cooperate with those of said driving clutch member, one of said driven clutch members having male cam teeth and the other having female cam teeth designed to mesh with each other within said transverse apertures, expansion springs independently to hold said driven clutch members in normal engagement with said driving clutch members, said cam teeth being adapted to unmesh and permit one driven clutch member to unmesh from said driving clutch member when unequal torque resistance is encountered by the shaft sections, the faces of said clutch teeth and the intervening spaces between them being concaved.

6. A differential comprising a driving clutch member, aligned shaft sections, means to mount said clutch member on the adjacent ends of said shaft sections, said driving clutch member having on both sides similar annular series of spaced generally radially disposed clutch teeth and having a corresponding set of transverse apertures, two independently driven clutch members located at opposite sides of said driving clutch member, one mounted on each shaft section to turn therewith and be slidable along the same, said two clutch members each having clutch teeth to cooperate with those of said driving clutch member, one of said driven clutch members having male cam teeth and the other having female cam teeth designed to mesh with each other within said transverse apertures, expansion springs independently to hold said driven clutch members in normal engagement with said driving clutch members, said cam teeth being adapted to unmesh and permit one driven clutch member to unmesh from said driving clutch member when unequal torque resistance is encountered by the shaft sections, said clutch teeth having their contacting edges undercut, the faces of said clutch teeth and the intervening spaces between them being concaved.

7. A differential comprising a driving clutch member, aligned shaft sections, means to mount said clutch member on the adjacent ends of said shaft sections, said driving clutch member having on both sides similar annular series of spaced generally radially disposed clutch teeth and having a corresponding set of transverse apertures, two independently driven clutch members located at opposite sides of said driving clutch member, one mounted on each shaft section to turn therewith and be slidable along the same, said two clutch members each having clutch teeth to cooperate with those of said driving clutch member, one of said driven clutch members having male cam teeth and the other having female cam teeth designed to mesh with each other within said transverse apertures, expansion springs independently to hold said driven clutch members in normal engagement with said driving clutch members, said cam teeth being adapted to unmesh and permit one driven clutch member to unmesh from said driving clutch member when unequal torque resistance is encountered by the shaft sections, and having their clutch teeth inclined to the vertical, the faces of said clutch teeth and the intervening spaces between them being concaved.

8. A differential comprising a driving clutch member, aligned shaft sections, means to mount said clutch member on the adjacent ends of said shaft sections, said driving clutch member having on both sides similar annular series of spaced generally radially disposed clutch teeth and having a corresponding set of transverse apertures, two independently driven clutch members located at opposite sides of said driving clutch member, one mounted on each shaft section to turn therewith and be slidable along the same, said two clutch members each having clutch teeth to cooperate with those of said driving clutch member, one of said driven clutch members having male cam teeth and the other having female cam teeth designed to mesh with each other within said transverse apertures, expansion springs independently to hold said driven clutch members in normal engagement with said driving clutch members, said cam teeth being adapted to unmesh and permit one driven clutch member to unmesh from said driving clutch member when unequal torque resistance is encountered by the shaft sections, said clutch teeth having their contacting edges undercut, and having their clutch teeth inclined to the vertical, the faces of said clutch teeth and the intervening spaces between them being concaved.

9. A differential comprising a driving clutch member, aligned shaft sections, means to mount said clutch member on the adjacent ends of said shaft sections, said driving clutch member having on both sides similar annular series of spaced generally radially disposed clutch teeth and having a corresponding set of transverse apertures, two independently driven clutch members located at opposite sides of said driving clutch member, one mounted on each shaft section to turn therewith and be slidable along the same, said two clutch members each having clutch teeth to cooperate with those of said driving clutch member, one of said driven clutch members having male cam teeth and the other having female cam teeth designed to mesh with each other within said transverse apertures, expansion springs independently to hold said driven clutch members in normal engagement with said driving clutch members, said cam teeth being adapted to unmesh and permit one driven clutch member to unmesh from said driving clutch member when unequal torque resistance is encountered by the shaft sections, and cross keys cooperating with said male and female clutch members to limit the distance which they may move apart.

10. A differential comprising a driving clutch member, aligned shaft sections, means to mount said clutch member on the adjacent ends of said shaft sections, said driving clutch member having on both sides similar annular series of spaced generally radially disposed clutch teeth and having a corresponding set of transverse apertures, two independently driven clutch members located at opposite sides of said driving clutch member, one mounted on each shaft section to turn therewith and be slidable along the same, said two clutch members each having clutch teeth to cooperate with those of said driving clutch member, one of said driven clutch members having male cam teeth and the other having female cam teeth designed to mesh with each other within said transverse apertures, expansion springs independently to hold said driven clutch members in normal engagement with said driving clutch members, said cam teeth being adapted to unmesh and permit one driven clutch member to unmesh from said driving clutch member when unequal torque resistance is encountered by the shaft sections, said clutch teeth having their contacting edges undercut, and cross keys cooperating with said male and female clutch members to limit the distance which they may move apart.

11. A differential comprising a driving clutch member, aligned shaft sections, means to mount said clutch member on the adjacent ends of said shaft sections, said driving clutch member having on both sides similar annular series of spaced generally radially disposed clutch teeth and having a corresponding set of transverse apertures, two independently driven clutch members located at opposite sides of said driving clutch member, one mounted on each shaft section to turn therewith and be slidable along the same, said two clutch members each having clutch teeth to cooperate with those of said driving clutch member, one of said driven clutch members having male cam teeth and the other having female cam teeth designed to mesh with each other within said transverse apertures, expansion springs independently to hold said driven clutch members in normal engagement with said driving clutch members, said cam teeth being adapted to unmesh and permit one driven clutch member to unmesh from said driving clutch member when unequal torque resistance is encountered by the shaft sections, and having their clutch teeth inclined to the vertical, and cross keys cooperating with said male and female clutch members to limit the distance which they may move apart.

12. A differential comprising a driving clutch member, aligned shaft sections, means to mount said clutch member on the adjacent ends of said shaft sections, said driving clutch member having on both sides similar annular series of spaced generally radially disposed clutch teeth and having a corresponding set of transverse apertures, two independently driven clutch members located at opposite sides of said driving clutch member, one mounted on each shaft section to turn therewith and be slidable along the same, said two clutch members each having clutch teeth to cooperate with those of said driving clutch member, one of said driven clutch members having male cam teeth and the other having female cam teeth designed to mesh with each other within said transverse apertures, expansion springs independently to hold said driven clutch members in normal engagement with said driving clutch members, said cam teeth being adapted to unmesh and permit one driven clutch member to unmesh from said driving clutch member when unequal torque resistance is encountered by the shaft sections, the faces of said clutch teeth and the intervening spaces between them being concaved, and cross keys cooperating with said male and female clutch members to limit the distance which they may move apart.

CLAYTON E. FREDERICKSON.